United States Patent
Yellapantula et al.

(10) Patent No.: US 9,749,097 B2
(45) Date of Patent: Aug. 29, 2017

(54) METHOD FOR WIRELESS COMMUNICATIONS TESTING USING DOWNLINK AND UPLINK TRANSMISSIONS BETWEEN AN ACCESS POINT AND MOBILE TERMINALS

(71) Applicant: LITEPOINT CORPORATION, Sunnyvale, CA (US)

(72) Inventors: Ramakrishna Yellapantula, Vernon Hills, IL (US); Soumyadeep Banerjee, Arlington Heights, IL (US); Steve Lawrence Sheya, Vernon Hills, IL (US)

(73) Assignee: LitePoint Corporation, Sunnyvale, CA (US)

( * ) Notice: Subject to any disclaimer, the term of this patent is extended or adjusted under 35 U.S.C. 154(b) by 187 days.

(21) Appl. No.: 14/730,969

(22) Filed: Jun. 4, 2015

(65) Prior Publication Data

US 2016/0359591 A1     Dec. 8, 2016

(51) Int. Cl.
  *H04L 1/20*    (2006.01)
  *H04L 1/18*    (2006.01)
  *H04L 1/16*    (2006.01)
  *H04W 24/06*   (2009.01)

(52) U.S. Cl.
  CPC .......... *H04L 1/203* (2013.01); *H04L 1/1607* (2013.01); *H04L 1/1812* (2013.01); *H04W 24/06* (2013.01)

(58) Field of Classification Search
  None
  See application file for complete search history.

(56) References Cited

U.S. PATENT DOCUMENTS

| | | | |
|---|---|---|---|
| 2007/0041349 A1 | 2/2007 | Kim et al. | |
| 2007/0253393 A1 | 11/2007 | Tseng | |
| 2008/0147370 A1 | 6/2008 | Sjerling | |
| 2012/0033606 A1* | 2/2012 | Chun | H04B 7/15528 370/315 |
| 2013/0114446 A1 | 5/2013 | Liu et al. | |
| 2014/0092839 A1* | 4/2014 | Park | H04L 1/1861 370/329 |
| 2015/0264708 A1* | 9/2015 | Li | H04W 28/06 370/329 |
| 2016/0261321 A1* | 9/2016 | Andgart | H04B 7/0456 |

OTHER PUBLICATIONS

Jun. 24, 2016—(WO) International Search Report—App PCT/US2016/022436.
3GPP TS Group Terminals: Terminal conformance specification: Radio transmission and reception (FDD) (Release 5), 3GPP TS 34.121 V5.6.0, Jan. 6, 2005, See pp. 405, 406, 415-421.

* cited by examiner

*Primary Examiner* — Yemane Mesfin
*Assistant Examiner* — Peter Chen
(74) *Attorney, Agent, or Firm* — Banner & Witcoff, Ltd.

(57) ABSTRACT

A method for wireless communications testing using downlink (DL) signal transmissions from an access point to a mobile terminal and uplink (UL) signal transmissions from said mobile terminal to said access point. Accurate block error rate (BLER) testing of LTE mobile devices in a wireless signal environment is enabled by preventing repeated transmissions of the same downlink (DL) data block that would normally follow reception of uplink (UL) transmissions of negative UL acknowledgments (NACKs) caused by failures to decode prior DL data transmissions, thereby producing cumulative NACK counts accurately reflecting data reception errors.

8 Claims, 3 Drawing Sheets

METHOD FOR WIRELESS COMMUNICATIONS TESTING USING DOWNLINK AND UPLINK TRANSMISSIONS BETWEEN AN ACCESS POINT AND MOBILE TERMINALS

BACKGROUND

The present invention relates to testing of one or more of multiple radio frequency (RF) data packet signal transceiver devices under test (DUTs) in a wireless signal test environment, and in particular, to enabling accurate block error rate (BLER) testing of LTE mobile devices in a wireless signal environment.

Many of today's electronic devices use wireless signal technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless signal technologies must adhere to various wireless signal technology standard specifications.

When designing such wireless devices, engineers take extra care to ensure that such devices will meet or exceed each of their included wireless signal technology prescribed standard-based specifications. Furthermore, when these devices are later being manufactured in quantity, they are tested to ensure that manufacturing defects will not cause improper operation, including their adherence to the included wireless signal technology standard-based specifications.

One common and widely used example of such devices is mobile, or cellular, telephone system that complies with the Third Generation Partnership Project (3GPP) Long Term Evolution (LTE) standard, used for voice and data communications (e.g., sending and receiving of text messages, Internet browsing, etc.). Such devices are produced in large quantities and must be individually tested during manufacturing, as well as after the actual manufacturing process prior to final shipment and sale, in which case such testing must generally be performed in a radiative, or wireless, signal environment. One example of such end-of-line device testing is for uplink (UL) and downlink (DL) BLER testing (e.g., defined as a ratio of the sum of NACKs and the sum of ACKs plus NACKs).

When such a mobile device goes through a certification process, or end-of-line testing, with test instrumentation, important tests necessary to pass include UL and DL BLER and throughput. To achieve accurate test results, it is necessary to avoid circumstances under which data blocks are re-transmitted to overcome signal conditions producing failed data transmissions, whether in the UL or DL direction, since such repeated transmissions can mask device failures and/or faulty testing conditions, as well as increase test time.

SUMMARY

In accordance with the presently claimed invention, a method is provided for wireless communications testing using downlink (DL) signal transmissions from an access point to a mobile terminal and uplink (UL) signal transmissions from said mobile terminal to said access point. Accurate block error rate (BLER) testing of LTE mobile devices in a wireless signal environment is enabled by preventing repeated transmissions of the same downlink (DL) data block that would normally follow reception of uplink (UL) transmissions of negative UL acknowledgments (NACKs) caused by failures to decode prior DL data transmissions, thereby producing cumulative NACK counts accurately reflecting data reception errors.

In accordance with one embodiment of the presently claimed invention, a method for wireless communications testing using downlink (DL) signal transmissions from an access point to a mobile terminal and uplink (UL) signal transmissions from the mobile terminal to the access point includes:

performing a portion of a plurality of DL signal transmissions including DL control information with a signal transmission control parameter related to a first maximum number of transmissions of each one of a plurality of successive DL data blocks in a subsequent portion of the plurality of DL signal transmissions;

performing the subsequent portion of the plurality of DL signal transmissions, wherein no transmission of any one of the plurality of successive DL data blocks exceeds the first maximum number;

performing each one of a plurality of UL signal transmissions responsive to a respective one of the subsequent portion of the plurality of DL signal transmissions and including
  a positive UL acknowledgment (ACK) for each one of the plurality of successive DL data blocks that has been successfully decoded, and
  a negative UL acknowledgment (NACK) for each one of the plurality of successive DL data blocks that has been unsuccessfully decoded; and performing another portion of the plurality of DL signal transmissions including further DL control information with the signal transmission control parameter related to a second maximum number of transmissions of each one of another plurality of successive DL data blocks in another subsequent portion of the plurality of DL signal transmissions, wherein the second maximum number is greater than the first maximum number.

In accordance with another embodiment of the presently claimed invention, a method for wireless communications testing using downlink (DL) signal transmissions from an access point to a mobile terminal and uplink (UL) signal transmissions from the mobile terminal to the access point includes:

performing a plurality of DL signal transmissions including a plurality of successive DL data blocks and a plurality of new data indicators (NDIs), wherein each one of the plurality of NDIs is
  associated with a respective one of the plurality of successive DL data blocks,
  indicative of when a subsequent one of the plurality of successive DL data blocks includes data different from a preceding one of the plurality of successive DL data blocks, and
  set to a value indicating that each subsequent one of the plurality of successive DL data blocks includes data different from a preceding one of the plurality of successive DL data blocks;

performing a plurality of UL signal transmissions responsive to the plurality of DL signal transmissions and including
  a positive UL acknowledgment (ACK) for each one of the plurality of successive DL data blocks that has been successfully decoded, and
  a negative UL acknowledgment (NACK) for each one of the plurality of successive DL data blocks that has been unsuccessfully decoded; and performing another plurality of DL signal transmissions including another plurality of successive DL data blocks and another plurality of NDIs, wherein each one of the another plurality of NDIs is associated with a respective one of the another plurality of successive DL data blocks, each one of a portion of the another plurality of NDIs following a respective portion of the plurality of UL signal transmissions including an ACK is set to a value indicating that a subsequent one of the plurality of successive DL data blocks includes data different from a preceding one of the plurality of successive DL data blocks, and each one of another portion of the another plurality of NDIs following a respective portion of the plurality of UL signal transmissions including a NACK is set to a value indicating that a subsequent one of the plurality of successive DL data blocks includes the same data as a preceding one of the plurality of successive DL data blocks.

DETAILED DESCRIPTION

Figure 1:
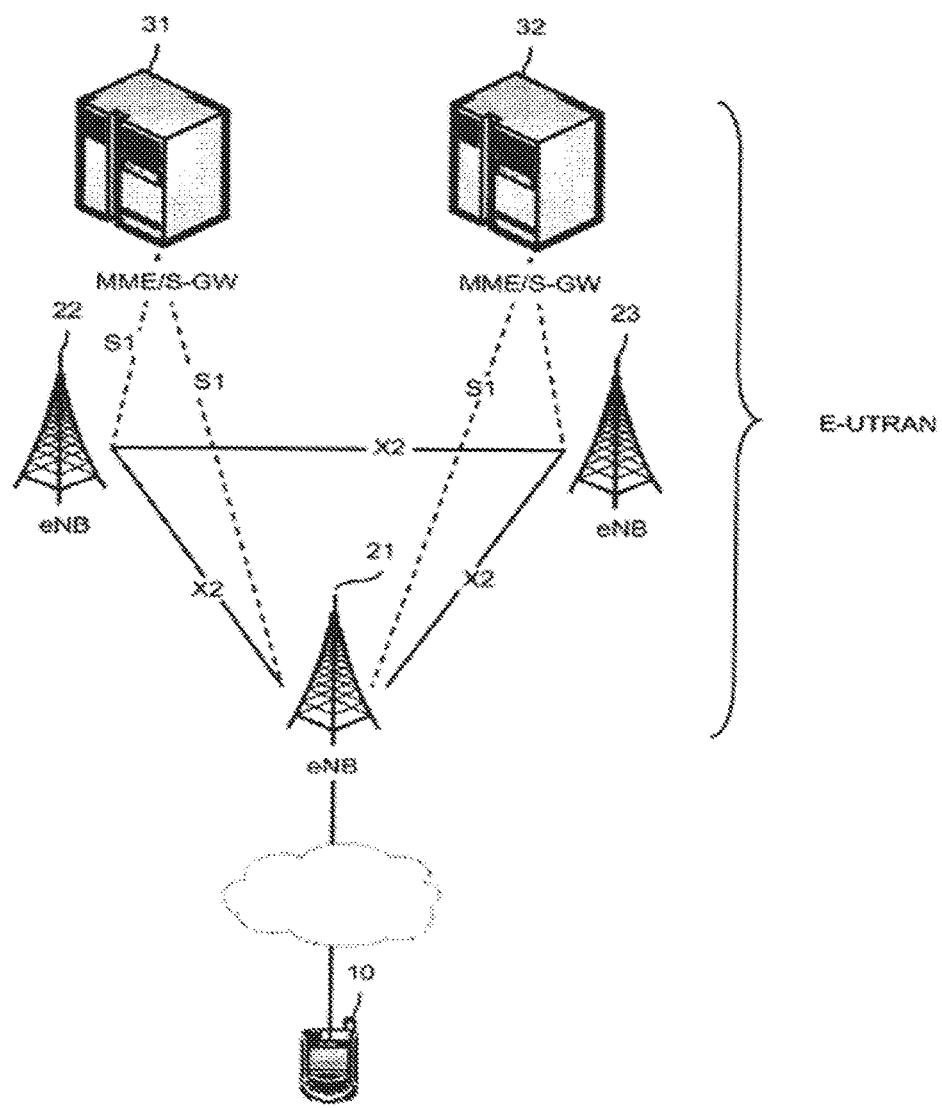
FIG. 1 depicts a network architecture of an Evolved Universal Mobile Telecommunications System (E-UMTS), which is also referred to as a Long-Term Evolution (LTE) system.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Wireless devices, such as cellphones, smartphones, tablets, etc., make use of standards-based technologies (e.g., IEEE 802.11a/b/g/n/ac, 3GPP LTE, and Bluetooth). The standards that underlie these technologies are designed to provide reliable wireless connectivity and/or communications. The standards prescribe physical and higher-level specifications generally designed to be energy-efficient and to minimize interference among devices using the same or other technologies that are adjacent to or share the wireless spectrum.

Tests prescribed by these standards are meant to ensure that such devices are designed to conform to the standard-prescribed specifications, and that manufactured devices continue to conform to those prescribed specifications. Most devices are transceivers, containing at least one or more receivers and transmitters. Thus, the tests are intended to confirm whether the receivers and transmitters both conform. Tests of the receiver or receivers (RX tests) of a DUT typically involve a test system (tester) sending test packets to the receiver(s) and some way of determining how the DUT receiver(s) respond to those test packets. Transmitters of a DUT are tested by having them send packets to the test system, which then evaluates the physical characteristics of the signals sent by the DUT.

For example, testing of wireless devices typically involves testing of the receiving and transmitting subsystems of each device. Receiver subsystem testing includes sending a prescribed sequence of test data packet signals to a DUT using different frequencies, power levels, and/or modulation types to determine if its receiving subsystem is operating properly. Similarly, transmitting subsystem testing includes having the DUT send test data packet signals at a variety of frequencies, power levels, and/or modulation types to determine if its transmitting subsystem is operating properly.

The inventive concepts and features herein related to a method for performing random access procedures are explained in terms of a Long Term evolution (LTE) system or other so-called 4G communication systems, which is an enhancement to current 3GPP technologies. However, such details are not meant to limit the various features described herein, which are applicable to other types of mobile and/or wireless communication systems and methods.

Hereafter, the term "mobile terminal" will be used to refer to various types of user devices, such as mobile communication terminals, user equipment (UE), mobile equipment (ME), and other devices that support various types of wireless communication technologies.

In traditional wireless telecommunications systems, transmission equipment in a base station or access device transmits signals throughout a geographical region known as a cell. As technology has evolved, more advanced equipment has been introduced that can provide services that were not possible previously. This advanced equipment might include, for example, an E-UTRAN (evolved universal terrestrial radio access network) node B (eNB), a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" can refer to any component, such as a traditional base station or an LTE eNB (Evolved Node B), that can provide a mobile terminal with access to other components in a telecommunications system.

Second generation (2G) mobile communications relate to transmitting and receiving voice signals in a digital manner, and include technologies such as CDMA, GSM, and the like. As an enhancement from GSM, GPRS was developed to provide packet switched data services based upon GSM.

Third generation (3G) mobile communications relate to transmitting and receiving not only voice signals, but also video and data. The 3GPP (Third Generation Partnership Project) developed the IMT-2000 mobile communication system and selected WCDMA as its radio access technology (RAT). The combination of IMT-2000 and WCDMA can be referred to as UMTS (Universal Mobile Telecommunications System), which comprises a UMTS Terrestrial Radio Access Network (UTRAN).

As data traffic has increased dramatically, standardization for 3rd generation mobile communications has progressed establish a Long-Term Evolution (LTE) network that supports greater bandwidth. LTE technologies are employed for an Evolved-UMTS (E-UMTS), which has an Evolved-UTRAN (E-UTRAN) that uses OFDMA (Orthogonal Frequency Division Multiple Access) as its radio access technology (RAT).

In mobile communication systems such as E-UTRAN, the access device provides radio access to one or more mobile terminals. The access device comprises a packet scheduler for allocating uplink and downlink data transmission resources amongst all the mobile terminals communicating with the access device. The functions of the scheduler include, among others, dividing the available air interface capacity between the mobile terminals, deciding the resources (e.g. sub-carrier frequencies and timing) to be used for each mobile terminal's packet data transmission including uplink and downlink, and monitoring packet allocation and system load. The scheduler allocates physical layer resources for downlink shared channel (PDSCH) and uplink shared channel (PUSCH) data transmissions, and sends scheduling information to the mobile terminals through a physical downlink control channel (PDCCH). The mobile terminals refer to the scheduling information for the timing, frequency, data block size, modulation and coding of uplink and downlink transmissions.

Several different downlink control information (DCI) message formats are used to communicate resource assignments to mobile terminals including, among others, a DCI format 0 for specifying uplink resources and DCI formats 1, 1A, 2 and 2A for specifying downlink resources. Uplink-specifying DCI format 0 includes several DCI fields, each of which includes information for specifying a different aspect of allocated uplink resources. Exemplary DCI format 0 DCI fields include a transmit power control (TPC) field, a cyclic shift demodulation reference signal (DM-RS) field, a modulating coding scheme (MCS) and redundancy version field, a New Data Indicator (NDI) field, a resource block assignment field and a hopping flag field. The NDI field may be a single bit field that has a value of either 0 or 1. If the DCI message indicates that new data is to be transferred using an established resource, the value of the NDI field may be toggled (i.e., from 0 to 1, and vice versa) from its previous value. By toggling the value of the NDI field, the DCI message indicates to the UE that new data is being transferred.

The downlink specifying DCI formats 1, 1A, 2 and 2A each include several DCI fields that include information for specifying different aspects of allocated downlink resources. Exemplary DCI format 1, 1A, 2 and 2A DCI fields include a Hybrid Automatic Repeat reQuest (HARQ) process number field, an MCS field, a New Data Indicator (NDI) field, a resource block assignment field and a redundancy version field. Each of the DCI formats 0, 1, 2, 1A and 2A includes additional fields for specifying allocated resources. The access device selects one of the downlink DCI formats for allocating resources to a mobile terminal as a function of several factors including UE and access device capabilities, the amount of data a mobile terminal has to transmit, the amount of communication traffic within a cell, etc.

After a DCI formatted massage is generated, an access device may generate a cyclic redundancy check (CRC) for the message and append the CRC to the DCI formatted message. Next, the access device may use a Cell-Radio Network Terminal Identifier (C-RNTI) or Semi-Persistent Scheduling Radio Network Terminal Identifier (SPS-RNTI) that is uniquely associated with a mobile terminal to scramble the CRC prior to transmitting the message to the mobile terminal. When the message is received at the mobile terminal, the mobile terminal calculates the CRC from the received message, uses the C-RNTI or SPS-RNTI to de-scramble the CRC and uses the de-scrambled CRC to ascertain whether the message was received accurately. If the CRC check indicates that the message was not intended for the UE (i.e. the CRC derived at the mobile terminal does not match the CRC attached to the received message), the mobile terminal may ignore the message.

In communications between an access device and a mobile terminal, HARQ is a scheme for re-transmitting a traffic data packet to compensate for an incorrectly received traffic packet. A HARQ scheme is used both in uplink and downlink transmissions in LTE systems. Take downlink PDSCH transmissions for example. For each downlink PDSCH packet received by a mobile terminal, a positive acknowledgment (ACK) is transmitted on a Physical Uplink Control Channel (PUCCH) from the mobile terminal to the access device after a cyclic redundancy check (CRC) performed by the mobile terminal indicates a successful decoding. If the CRC indicates a packet is not received correctly, a mobile terminal HARQ entity transmits a negative acknowledgement (NACK) on the PUCCH in order to request a retransmission of the erroneously received PDSCH packet. Once a HARQ NACK is transmitted to an access device, the mobile terminal waits to receive a retransmitted traffic data packet. When the HARQ NACK is received at an access device, the access device retransmits the incorrectly received packet to the mobile terminal, possibly using a different redundancy version out of various available redundancy versions. This process of transmitting, ACK/NACK and retransmitting continues until either the packet is correctly received or a maximum number of retransmissions has been reached.

Whenever control information has to be transmitted between an access device and a mobile terminal, the resources required to complete that transmission cannot be used to transmit other information such as voice or application information and data. For this reason, it is important to minimize the amount of control data required for controlling communications between and access device and a mobile terminal.

Referring to FIG. 1, the network architecture of an Evolved Universal Mobile Telecommunications System (E-UMTS) is a system that has evolved from UMTS and its basic standardization is currently being performed by the 3GPP organization. The E-UMTS system is also referred to as an LTE (Long-Term Evolution) system.

The E-UMTS network can be basically divided into the E-UTRAN and the CN (core network). The E-UTRAN includes a mobile terminal (User Equipment: UE) 10, a base station (eNode B: eNB) 21, 22, 23 (all referred to as 20), a serving gateway (S-GW) 31 located at the end of the network and connected to external networks, and a Mobility Management Entity (MME) 32 that oversees the mobility of the mobile terminals. For a single eNode B 20, one or more cells may exist.

Figure 2:
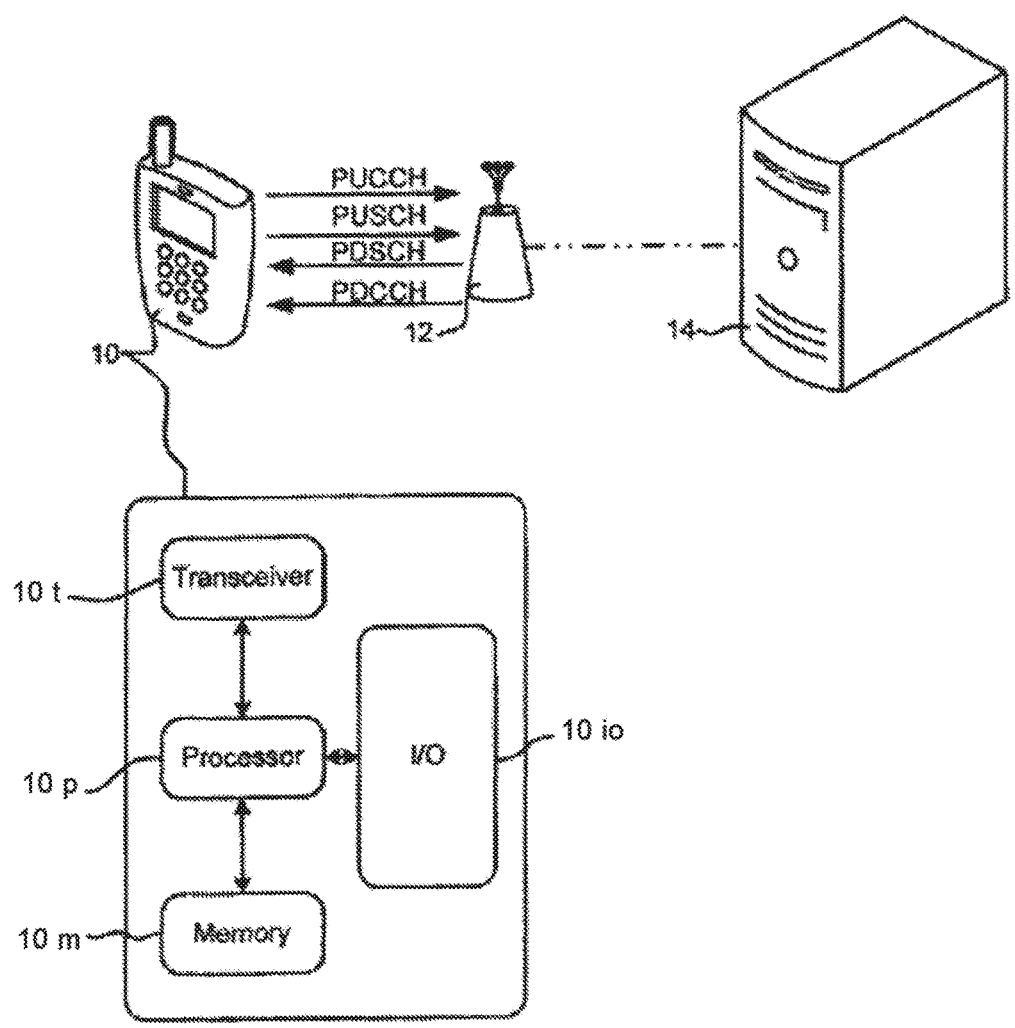
FIG. 2 depicts a portion of a typical LTE communication system.

Referring to FIG. 2, a communication system typically includes a mobile terminal 10, an access device 12 and a server 14. The mobile terminal 10 includes a processor 10*p*, a transceiver 10*t*, a memory 10*m* and input/output (I/O) devices 10*io*. The memory 10*m* stores programs that are run by the processor 10*p* to perform various communication functions including the functions as discussed herein. The I/O 10*io* may include a display screen, a microphone, a speaker, input keys on a phone or portable computer, etc.

The mobile terminal 10 communicates with the access device 12 (e.g., an evolved Node B (eNB)) via various uplink (UL) and downlink (DL) communication channels. While mobile terminals 10 and access devices 12 use many different channels to facilitate communications, to simplify this explanation, only four channels are illustrated including a physical downlink control channel (PDCCH), a physical uplink control channel (PUCCH), and various shared channels including a physical downlink shared channel (PDSCH) and a physical uplink shared channel (PUSCH).

The access device 12 hosts multiple functions including but not limited to radio resource management including radio bearer control, radio admission control, connection mobility control, dynamic allocation of resources to mobile terminals in both uplink and downlink scheduling, IP header compression and encryption of user data stream, scheduling and transmission of broadcast information and measurement and measurement reporting configuration for mobility and scheduling.

Figure 3:
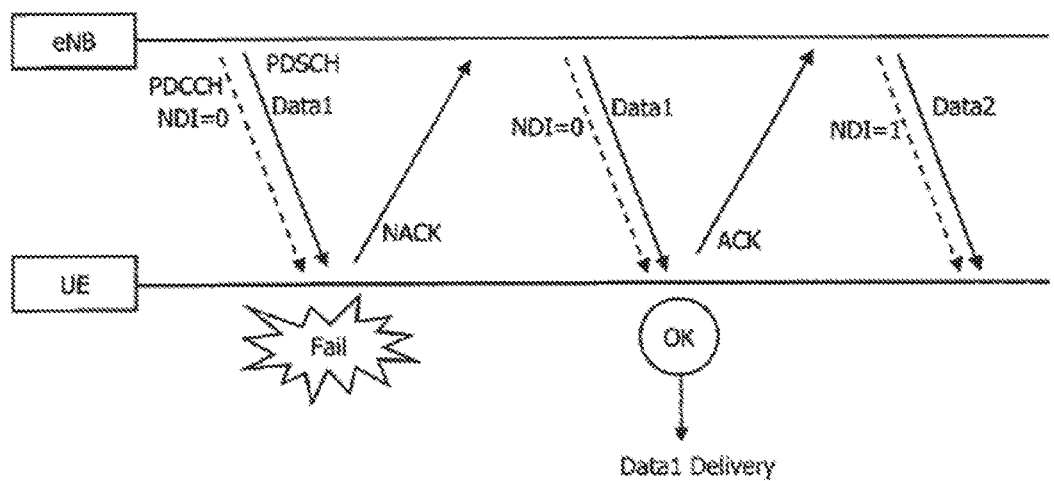
FIG. 3 depicts exemplary HARQ operations between an access point (eNB) and a mobile terminal (UE).

Referring to FIG. 3, exemplary downlink HARQ operations that may be performed in the MAC layer begin with the base station transmitting data to the terminal by first transmitting scheduling information through a PDCCH (Physical Downlink Control Channel). Such scheduling information may include terminal identifiers or terminal group identifiers (i.e. UE ID or Group ID), position of allocated radio resources (i.e. resource assignment), transmission parameters (i.e. modulation methods, payload size, MIMO related information, etc.), HARQ process information, redundancy version, and new data indicators, and the like. The scheduling information is transferred through the PDCCH with respect to retransmissions, and the corresponding information may change according to the channel environment. For example, if the channel environment has become better than that of initial transmission, the modulation method, payload size, etc. may be changed to allow transmission at a higher bit rate, but if the channel environment has become worse than that of initial transmission, then transmissions may be performed at a lower bit rate.

The terminal monitors the control channel (PDCCH) at each TTI, and checks the scheduling information that is received. If there is any scheduling information pertaining to the terminal, data is received from the base station through the PDSCH (Physical Downlink Shared Channel) at a time related to the PDCCH.

The terminal receives PDSCH data and stores such in a soft buffer and attempts decoding of such data. Based upon the results of such decoding, HARQ feedback is provided to the base station. Namely, the terminal sends to the base station an ACK signal if decoding is successful or a NACK signal if decoding is unsuccessful.

If an ACK signal is received, the base station knows that data transmission was successful and then transmits subsequent data. However, if a NACK signal is received, the base station knows that data transmission was unsuccessful and the same data is retransmitted in the same or different format at the appropriate time.

The terminal that sent the NACK signal, attempts reception of the data that was retransmitted. The terminal can know whether the transmitted data is an initial transmission or a retransmission of previous data by considering the NDI (New Data Indicator) in the PDCCH.

The NDI field is a one bit field that is toggled (0->1->0->1-> . . . ) whenever new data is transmitted, while the same bit value is used for a retransmission. In other words, the terminal compares whether the NDI field is the same as that of the previous transmission to determine whether or not a retransmission has been performed.

When the terminal receives retransmitted data, decoding thereof can be attempted again by using various combinations of the data previously stored in the soft buffer after unsuccessful decoding, and an ACK signal (upon successful decoding) or a NACK signal (upon unsuccessful decoding) is sent to the base station. The terminal may repeat the procedures of sending NACK signals and receiving retransmissions until decoding is successful.

For the uplink direction (from terminal to base station), synchronous HARQ is employed. Here, synchronous HARQ refers to a technique where the time interval for each data transmission is the same. Namely, when the terminal should perform retransmission after an original transmission, such retransmission occurs at a certain time after the original transmission. As such, using the same time interval reduces any waste of radio resources that would be needed if scheduling information is transmitted using the PDCCH at various different retransmission points of time, and also results in a decrease in situations where the terminal cannot perform appropriate retransmissions because the PDCCH was not properly received.

In such synchronous HARQ procedure, values indicating the maximum number of transmissions and the maximum number of retransmissions are used. The maximum number of transmissions is a value that is one greater than the maximum number of retransmissions (i.e. Max. # of re-Tx=Max. # of Tx+1), and both values have the same purpose. Namely, these values indicate the maximum number of times that a particular data block can be transmitted (or retransmitted) through HARQ. A maximum number of retransmissions is provided in order to minimize the delays or bottleneck in transferring data that would occur if retransmissions were unlimited, and to consider the mobile communications environment that requires sharing of radio resources among multiple users.

If the terminal receives a NACK signal from the base station with respect to its original transmission, retransmissions are performed and if the maximum number of retransmissions is reached (but still unsuccessful), further transmission of the corresponding data is stopped and such data is deleted from the buffer. Hence, for a terminal that is connected with a base station, a value regarding the maximum number of transmissions is received. While a connection is established, the terminal continues to use such value to perform HARQ.

However, as noted above, for BLER test results, it is necessary to avoid circumstances under which data blocks are re-transmitted to overcome signal conditions producing failed data transmissions, whether in the UL or DL direction, since such repeated transmissions can mask device failures and/or faulty testing conditions, as well as increase test time. In accordance with the presently claimed invention, undesired repeated transmissions can be prevented by using inherent properties of LTE signaling operation standards.

In accordance with exemplary embodiments of the presently claimed invention, the "maxHARQ-Tx" and an internal eNodeB parameter for governing downlink transmissions are set to unity (1) during UL & DL BLER and throughput testing. Following such testing, these parameters can be returned to their default values when signaling messages are being conveyed between the UE and eNodeB. For achieving this, RRC Connection Reconfiguration messages can be sent by the eNodeB to the UE before and after the UL & DL BLER and throughput tests for reconfiguring the "maxHARQ-Tx", while at the same time, the eNodeB can reconfigure its internal parameter for governing DL transmissions.

This method, requires two additional RRC Connection Reconfigurations each time UL and DL BLER and throughput are tested. Hence, test time is increased some to accommodate the additional RRC Connection Reconfigurations. Some additional complexity in the test instrument design may also be needed to keep track of the points in time when UL and DL BLER and throughput tests begin and end for reconfiguring the "maxHARQ-Tx" and the internal eNodeB parameter for controlling DL transmissions.

In accordance with further exemplary embodiments of the presently claimed invention, such potentially increased test time and complexity can be avoided by instead toggling the NDI bit in the DCI 0/1/1A/2/2A messages in every subframe when the UL & DL BLER and throughput tests are being performed, regardless of the ACK/NACK messages reported by the UE or the eNodeB. Following completion of the UL and DL BLER and throughput tests, such toggling of the NDI bit in every subframe can be discontinued and normal operation resumed so that toggling of the NDI bit is done only when new data is transmitted while returning to normal operation when important control messages are exchanged to maintain the reliability of the link.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for wireless communications testing using downlink (DL) signal transmissions from an access point to a mobile terminal and uplink (UL) signal transmissions from said mobile terminal to said access point, comprising:
performing a portion of a plurality of DL signal transmissions including DL control information with a signal transmission control parameter related to a first maximum number of transmissions of each one of a plurality of successive DL data blocks in a subsequent portion of said plurality of DL signal transmissions;
performing said subsequent portion of said plurality of DL signal transmissions, wherein no transmission of any one of said plurality of successive DL data blocks exceeds said first maximum number;
performing each one of a plurality of UL signal transmissions responsive to a respective one of said subsequent portion of said plurality of DL signal transmissions and including
a positive UL acknowledgment (ACK) for each one of said plurality of successive DL data blocks that has been successfully decoded, and
a negative UL acknowledgment (NACK) for each one of said plurality of successive DL data blocks that has been unsuccessfully decoded; and
performing another portion of said plurality of DL signal transmissions including further DL control information with said signal transmission control parameter related to a second maximum number of transmissions of each one of another plurality of successive DL data blocks in another subsequent portion of said plurality of DL signal transmissions, wherein said second maximum number is greater than said first maximum number.

2. The method of claim 1, further comprising performing said another subsequent portion of said plurality of DL signal transmissions, wherein transmissions of one or more of said another plurality of successive DL data blocks exceeds said first maximum number.

3. The method of claim 1, wherein said first maximum number equals unity.

4. The method of claim 1, wherein a ratio of a sum of said NACKs and a sum of said ACKs and NACKs defines a data block error rate.

5. The method of claim 1, wherein:
said performing said portion and said subsequent portion of said plurality of DL signal transmissions comprises conveying said plurality of DL signal transmissions via a plurality of DL channels; and
said performing each one of said plurality of UL signal transmissions comprises conveying said plurality of UL signal transmissions via a plurality of UL channels.

6. A method for wireless communications testing using downlink (DL) signal transmissions from an access point to a mobile terminal and uplink (UL) signal transmissions from said mobile terminal to said access point, comprising:
performing a plurality of DL signal transmissions including a plurality of successive DL data blocks and a plurality of new data indicators (NDIs), wherein each one of said plurality of NDIs is
associated with a respective one of said plurality of successive DL data blocks, and
set to a value indicating that each subsequent one of said plurality of successive DL data blocks includes data different from a preceding one of said plurality of successive DL data blocks;
performing a plurality of UL signal transmissions responsive to said plurality of DL signal transmissions and including
a positive UL acknowledgment (ACK) for each one of said plurality of successive DL data blocks that has been successfully decoded, and
a negative UL acknowledgment (NACK) for each one of said plurality of successive DL data blocks that has been unsuccessfully decoded; and
performing another plurality of DL signal transmissions including another plurality of successive DL data blocks and another plurality of NDIs, wherein
each one of said another plurality of NDIs is associated with a respective one of said another plurality of successive DL data blocks,
each one of a portion of said another plurality of NDIs following a respective portion of said plurality of UL signal transmissions including an ACK is set to a value indicating that a subsequent one of said plurality of successive DL data blocks includes data different from a preceding one of said plurality of successive DL data blocks, and each one of another portion of said another plurality of NDIs following a respective portion of said plurality of UL signal transmissions including a NACK is set to a value indicating that a subsequent one of said plurality of successive DL data blocks includes the same data as a preceding one of said plurality of successive DL data blocks.

7. The method of claim 6, wherein a ratio of a sum of said NACKs and a sum of said ACKs and NACKs defines a data block error rate.

8. The method of claim 6, wherein:

said performing said plurality of DL signal transmissions comprises conveying said plurality of DL signal transmissions via a plurality of DL channels; and said performing said plurality of UL signal transmissions comprises conveying said plurality of UL signal transmissions via a plurality of UL channels.

\* \* \* \* \*